Patented Aug. 29, 1939

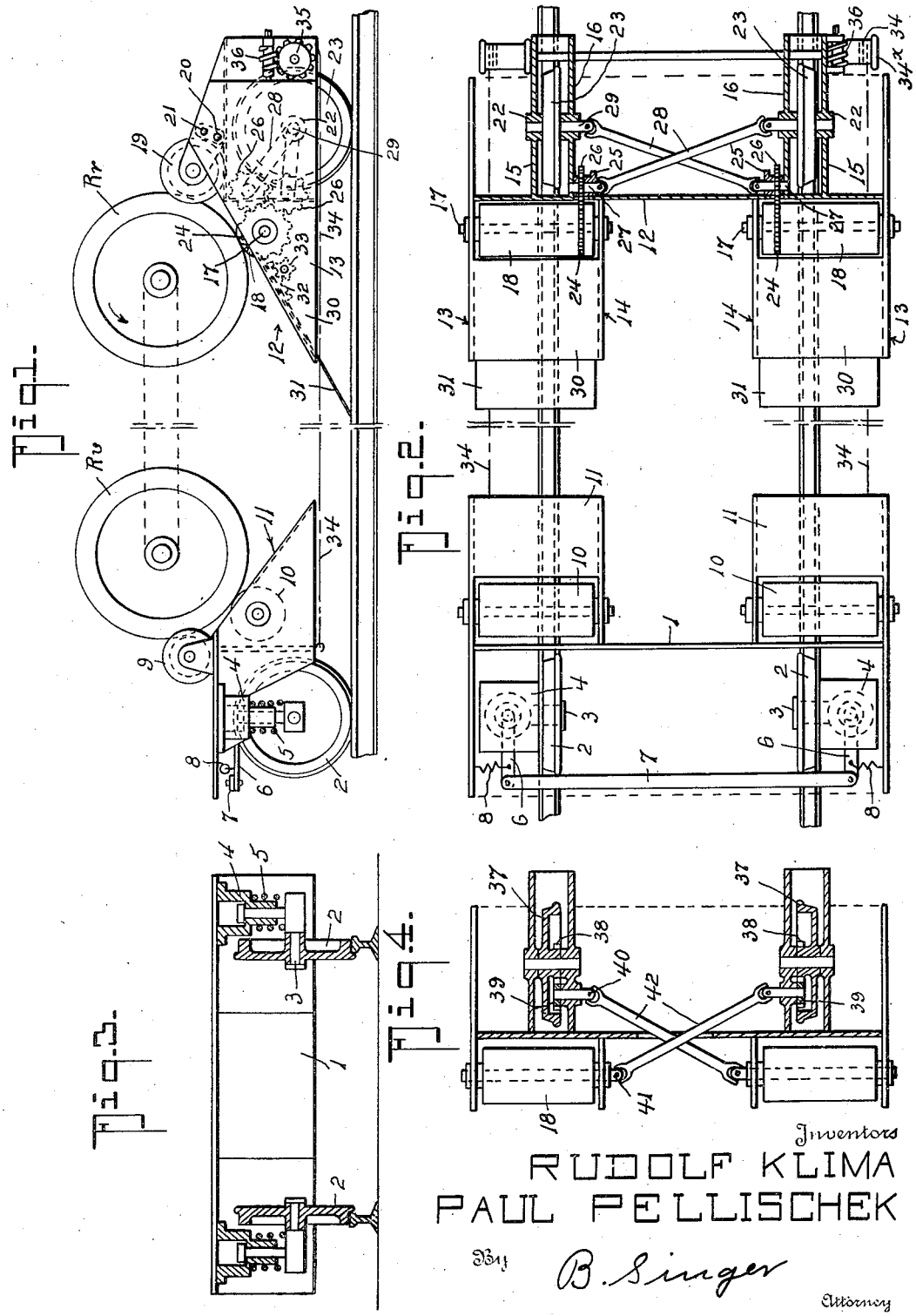

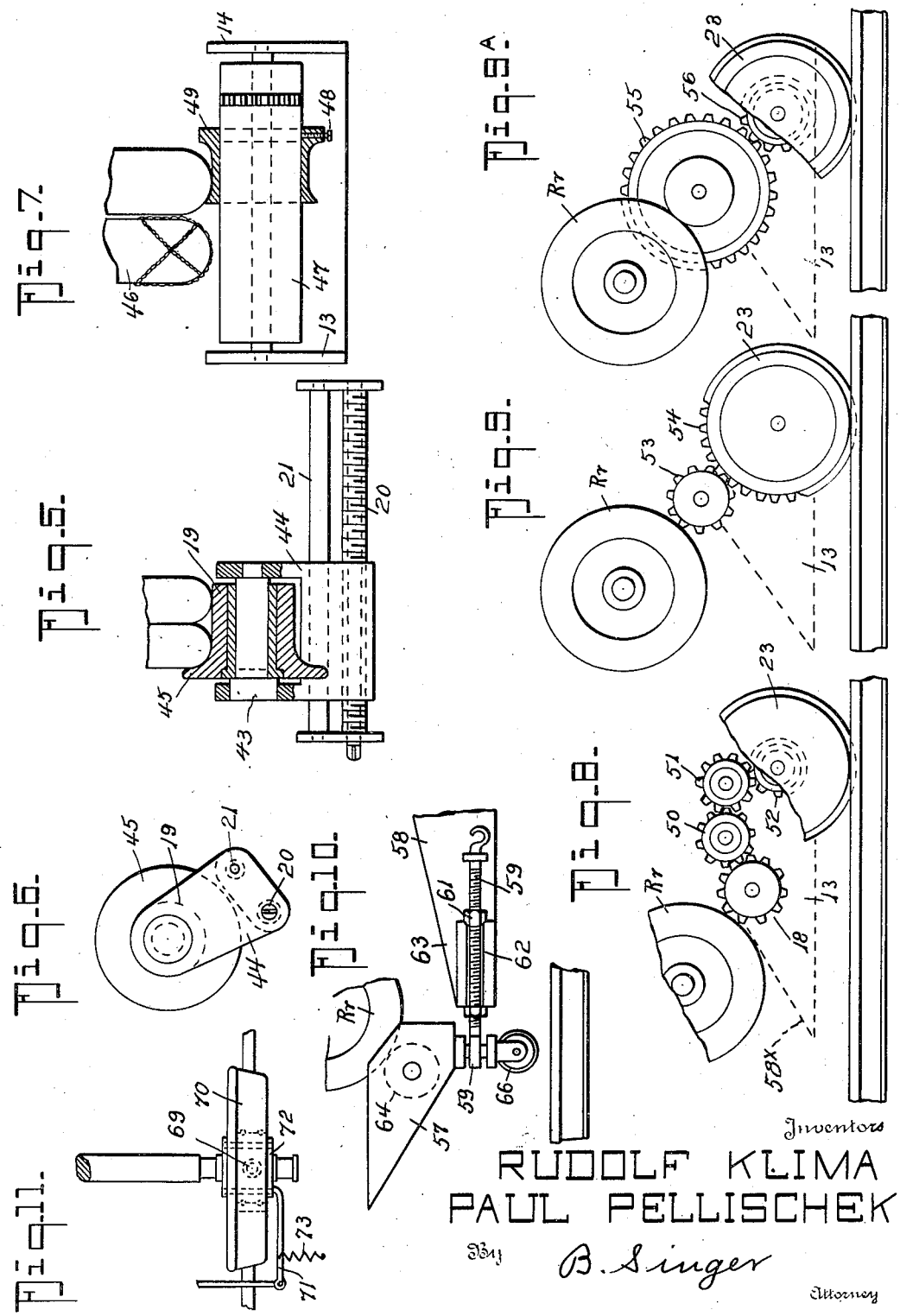

2,171,093

UNITED STATES PATENT OFFICE 2,171,093

ADAPTABLE RAIL TROLLEY

Rudolf Klima, Salzburg, and Paul Pellischek, Vienna, Austria

Application May 22, 1937, Serial No. 144,272
In Austria May 22, 1936

10 Claims. (Cl. 105—159)

This invention relates to accessory means for converting a vehicle of one type into a vehicle of another type, and more particularly for converting motor-propelled road vehicles into motor rail trolleys, and has for its main objects to improve the traveling qualities including passing around curves, to increase the efficiency of the power transmission from the supported road vehicle to the rail trolley sub-structure, and to enlarge the sphere of application of such vehicles.

Forms of construction embodying this invention, and details thereof, are shown, by way of example, in the accompanying drawings which form part of this specification, and in which:

Fig. 1 is a diagrammatic side elevation of a rail trolley according to the invention consisting of a front steering truck and a rear driving truck coupled together by means of tensile tie members, adapted to carry for instance an automobile, and having propeller shaft power transmission from the friction roller coacting with the driving wheels of the automobile to the driving wheels of the trolley.

Fig. 2 shows the same arrangement in plan view.

Fig. 3 is a sectional end elevation of the front steering truck.

Fig. 4 shows a modified type of propeller shaft transmission in which the propeller shafts are coupled directly to the friction roller.

Fig. 5 shows, in sectional elevation, a laterally slidable roller abutment, and

Fig. 6 the same in side elevation.

Fig. 7 shows in sectional elevation a sleeve ring slidably adjustable and fixable on the friction roller for the supporting of a wheel not clad with anti-skid elements or snow-chains.

Fig. 8 shows a type of power transmission from the friction roller to the trolley axle with the aid of a plurality of sets of countershaft gearing.

Fig. 9 shows a transmission by which power is conveyed from the friction roller or a gear wheel attached thereto to a spur wheel on the running wheel of the trolley.

Fig. 10 shows an articulate coupling between two wheel supporting units.

Fig. 11 shows a leading axle with swivel pin placed in the centre of the wheel.

Referring to Figs. 1, 2, and 3 of the drawings, 1 denotes the cross tie frame of the front truck, and 2 the running wheels which revolve about the journals 3. These journals are adapted to swivel about vertical pivots 4 disposed outside the flanges of the running wheels. The pivot pins are guided in bearing sockets secured to the frame 1 and are cushioned by coil springs 5, which may be provided for example outside the said bearing sockets, so that the running wheels are sprung. Resilience between the running wheel and its axle may of course also be provided for by the use of any other known means, such as rubber buffers or pads between the body of the wheel and its rim, or the like.

To the upper end of these pivot pins 4 there are attached arms 6 which are parallel to each other when the wheels are in the mid position, and which are coupled together by an articulated rod 7 and normally retained in the mid position by tension springs 8 secured to the frame as long as no forces are exerted upon the wheel flanges. When the front truck runs into a curve the rail on the outside of the curve exerts upon the wheel flange, which runs against the rail in the direction of a chord, a moment of rotation which is favorable for the radial setting of the wheel in the curve.

The radial setting of the wheel running on to the outside of the curve causes the other wheel, through the intermediary of the articulate coupling 6, 7, to assume the same position. The returning of the wheels into the straight position is effected automatically by the restoring springs 8 tensioned between the frame and the described system of links, on both sides. With this type of front truck axle, responsive to the interaction of rail and wheel flange, there is obtained, in conjunction with the placing of the pivot of each wheel outside the flange thereof, that is to say outside the rim or tread thereof, a faultless radial setting of the wheels and safe traveling in the curves at undiminished speed, without the necessity for any intervention on the part of the person operating the vehicle.

The wheels of the road vehicle are saved from skidding sideways when the converted vehicle is traveling in a curve by the provision of lateral abutment rollers 9, while the weight of the superposed vehicle is taken up by the idle rollers 10 which may be locked against rotation when the superposed vehicle is not provided with front wheel drive. For the driving on and lifting of the superposed vehicle there serves a conventional type of tiltable ramp 11 which is likewise connected to the frame. The rail wheels of the rear truck are bridged over by the transversely tied frame 12 the ends of which are closed by walls 13 and 14. This frame rests by means of the ribs 15 and 16 upon the axle trunnions. The rear wheels of the superposed vehicle bear upon the friction rollers 18 which are mounted with their shafts 17 in the truck frame, and which constitute part of the power transmission train from the road vehicle wheels to the rail vehicle wheels. The abutment rollers 19 serving to prevent lateral displacement of the superposed vehicle under the influence of centrifugal force are adapted to be shifted along a guide rod 21, according to the width of the tread of the superposed vehicle, by means of a hand operable screw spindle 20.

In the supporting ribs 15 and 16 there are provided the bearings 22 for the rail wheels 23. The gear wheel 24, which is preferably somewhat countersunk in the friction roller, meshes with a gear wheel 26 which is supported in a bearing extension 25, and from the axle 27 of which a power transmission shaft 28 leads to the axle 29 of the rail wheel on the opposite side of the truck. In order to ensure frictionless crossing of the two propeller shafts 28 the two gear wheels 26 are mounted at different levels. By virtue of this arrangement the power is transmitted with the minimum number of transmission elements and with maximum efficiency.

The ramp 30 for the rear wheels of the superposed vehicle is made in two parts, and adapted to be lengthened and shortened with the lower extension 31 by means of racks 32 and pinions 33. When the combined vehicle is traveling on rails this lower extension of the ramp is retracted. The two trucks are coupled together by means of tension tying elements, such as cables, chains 34, or the like, which are put under tension by the weight of the superposed vehicle. When one end of the road vehicle has been driven up on to its appropriate truck, and the tie members between the two trucks coupled up, the other truck is drawn under the other end of the road vehicle by the winding in of the said tying members on to the drums 34$^x$ of winches provided on each side of the frame and consisting of worm wheel 35 and worm 36 and a shaft 36$^x$ common to both drums 34$^x$, until the road vehicle is completely lifted and in its proper position on the two trucks. The cables have one of their ends suitably anchored to the front trucks while their other ends are connected to the drums 34$^x$ on which the cables may be wound to draw the front and rear trucks toward each other and thereby raise the road vehicle to the position where its front wheels R$v$ will engage rollers 9 and 10 and its rear wheels R$r$ will engage rollers 18 and 19 (see Fig. 1). With the type of transmission shown in Fig. 4 the hubs of the driving rail wheels 37 are provided with toothed rims 38 which mesh with gear wheels 39 mounted in the carrying ribs and of which the axles 40 are each driven by a propeller shaft 42 directly coupled to the friction roller shafts 41 on the far side of the truck.

Fig. 5 illustrates the inclusion of a guide roller 19 which is rotatable on a pin 43 mounted in the bracket 44, and which is provided with a flange 45 to prevent the superposed vehicle from being flung to one side by centrifugal force when the combined vehicle is travelling in a curve. In this case also, as in the case of the form of construction shown in Fig. 1, this roller is adjustable to suit the width of the track of the superposed vehicle, for instance by means of mechanism operable by a crank handle.

Fig. 6 shows a guide roller of this type in side elevation. In view of the high speed of all the moving parts of a trolley of the described type the rims are preferably mounted on ball or roller bearings, and where necessary on interchangeable bearings. For the purpose of enabling the drive to be taken, in winter, from vehicles of which some of the wheels 46 are furnished with anti-skid elements or snow-chains the driving wheels which are not so clad are arranged to be placed, as shown in Fig. 7, on sleeve rings 49 fitted on to the friction rollers 47 and secured thereto by any suitable clamping or fixing means such as for example screws 48, that is to say in a raised position, while the chain-clad wheels do not bear. A modified form of transmission for a truck 58$^x$ is shown in Fig. 8, in which the drive is transmitted from the friction rollers through a series of sets of countershaft gearing 50, 51, and 52, to the rail wheels, whereas with the transmission shown in Fig. 9 the drive is transmitted from the friction rollers or from the gear wheels 53 keyed to the same axles, directly to the toothed spur rims 54 attached to the rail wheels. A further modified form of transmission is that shown in Fig. 9A in which gear wheels 55 attached to the inner ends of the friction roller shaft outside the ramps mesh with gear wheels 56 secured to the axles of the rail wheels. In place of these two gear wheels it is also possible to use chain sprocket wheels and chain drive, provided these wheels be disposed at a suitable distance apart.

If it is desired to distribute the load of the superposed vehicle over a plurality of rail wheel axles it is perfectly possible for example to place the load of one road vehicle axle upon two rail wheel axles. In this case, after the axle concerned has been brought into position on a truck a second truck 57 is brought up and coupled to the first truck 58 (which, for instance, may be the truck 58$^x$, Fig. 8) by means of a draw rod 59 which is swiveled about a vertical axis, as shown in Fig. 10 of the drawings. This rod, which is provided with screw threading and tightening nuts 60 (of which the right-hand pressing nut 61 is of spherical shape), is placed in the respective open or slotted recess 62 (which likewise terminates spherically at the right-hand end) in the coupling lug 63 pertaining to the right-hand truck, and so firmly tightened up by means of the pressing nut that the running rollers 64 on the middle axle are firmly pressed against the wheels of the road vehicle. The spherical pressing nut prevents lateral slipping. It is of course a matter of choice whether these intermediate supporting axles are idle running or driving axles.

To facilitate the addition of the middle axle there are provided retractable auxiliary wheels 66.

Finally, if the guide roller 19 be made pivotally movable, by pivoting the spindle bearings 20 and mounting the bearings for the guide rods 21 in suitable arcuate slots, it is perfectly possible to adjust the guide rollers not only, as above described, to the spacing of the wheels placed thereon but also to the diameter of these wheels. The fixing of this adjustment at the said slots may be effected in a conventional manner.

In the modified type of front truck axle shown in Fig. 11 the pivot point, that is to say the pivot and carrying pin 69 of the wheel 70, is placed in the centre of the wheel. The axle is in this case continuous and rests upon the pins with sufficient rotary play in the wheel. The adjustment of the second wheel is effected in the same manner as in the case of the form of construction shown in Figs. 1 and 2, by means of the articulated levers 71 which in this case are attached to the fixed bearing bushes 67 and returned to the basic position by means of the restoring springs 68. It will be clear that this type of front axle with the pivot axis disposed outside the wheel rim or tread may also be used in general in the construction of railroad vehicles.

It is a matter of choice whether both axles or only the front axle are provided with pivoted wheels. In the former case it of course becomes possible to operate in both directions, that is to say to travel if desired with the driving axle foremost, at equal speed. It is advisable to build the front and middle running axles alike, for the sake of standardized construction and convenience in use, although a differentiation between light and heavy trolley types for carrying automobiles and motor trucks, respectively, is unavoidable. Trolleys having nothing but non-driven wheels may of course be used in trailers and for like purposes.

The advantages of working with trolleys made up of single-axle trucks, such as small requirement in the matter of space, light weight, ease of transport, ready adaptability of the number of supporting axles to the load to be carried, good manoeuvring qualities, high traveling speed, ease of loading and unloading, possibility of traveling under own power of the superposed vehicle, and the like, are of decisive significance for the economy and practicability of the described system.

We claim:

1. In mechanism for the purpose described, a front and a rear truck each including a frame carrying railway wheels to run on a track and each including a ramp to be inserted beneath the wheels of a road vehicle, means coupling the front and rear trucks together and including means to draw them toward each other to cause the road-vehicle wheels to run up the ramp whereby the road vehicle will be supported by the trucks, each truck also including friction rollers on which the road-vehicle wheels rest, abutment rollers against which the road-vehicle wheels press to cause elevation of the ramp from contact with the ground as said trucks are drawn toward each other, and power-transmitting connections between the friction rollers of one of said trucks and the railway wheels of the same.

2. In mechanism for the purpose described, a front and a rear truck each including a frame carrying railway wheels to run on a track and each including a ramp to be inserted beneath the wheels of a road vehicle, means coupling the front and rear trucks together and including means to draw them toward each other to cause the road-vehicle wheels to run up the ramp whereby the road vehicle will be supported by the trucks, each truck also including friction rollers on which the road-vehicle wheels rest, abutment rollers against which the road-vehicle wheels press to cause elevation of the ramp from contact with the ground as said trucks are drawn toward each other, and power-transmitting connections between the friction rollers of one of said trucks and the railway wheels of the same, the other truck having means resiliently and steerably to mount its railway wheels.

3. In mechanism for the purposes described, a front and a rear truck, each of said trucks comprising a frame, a pair of wheels on the common axles of which said frame is pivotally mounted, a ramp, friction rollers located adjacent said ramp to support the wheels of a road vehicle and abutment rollers located at a higher level than said friction rollers and said axes, and means coupling the front and rear trucks together and including means for drawing the trucks toward each other to cause the wheels of the road vehicle to run up the respective ramps onto the respective friction rollers and to engage said abutment rollers to rock the truck frames on their pivots, thereby raising the ramps clear of the ground and elevating the road vehicle, one of said trucks also including power-transmission mechanism between its friction rollers and its railway wheels.

4. In mechanism for the purposes described, a front and a rear truck, each of said trucks comprising a frame, a pair of wheels on the common axes of which said frame is pivotally mounted, a ramp, friction rollers located adjacent said ramp to support the wheels of a road vehicle and abutment rollers located at a higher level than said friction rollers and said axes, and means coupling the front and rear trucks together and including means for drawing the trucks toward each other to cause the wheels of the road vehicle to run up the respective ramps onto the respective friction rollers and to engage said abutment rollers to rock the truck frames on their pivots, thereby raising the ramps clear of the ground and elevating the road vehicle, one of said trucks also including power-transmission mechanism between its friction rollers and its railway wheels, said power-transmission mechanism comprising toothed wheels carried by and of the same circumference as the friction rollers, cog wheels carried at each side of the truck by the frame of the truck with which the respective toothed wheels mesh, and Cardan shafts for connecting the cog wheel at a side of the truck with the railway wheel at the opposite side of the truck, respectively.

5. In mechanism for the purposes described, a front and a rear truck, each of said trucks comprising a frame, a pair of wheels on the common axes of which said frame is pivotally mounted, a ramp, friction rollers located adjacent said ramp to support the wheels of a road vehicle and abutment rollers located at a higher level than said friction rollers and said axes, and means coupling the front and rear trucks together and including means for drawing the trucks toward each other to cause the wheels of the road vehicle to run up the respective ramps onto the respective friction rollers and to engage said abutment rollers to rock the truck frames on their pivots, thereby raising the ramps clear of the ground and elevating the road vehicle, one of said trucks also including power-transmission mechanism between its friction rollers and its railway wheels, said power-transmission mechanism comprising gear trains connecting the friction rollers with their respective railway wheels.

6. In mechanism for the purposes described, a front and a rear truck, each of said trucks comprising a frame, a pair of wheels on the common axes of which said frame is pivotally mounted, a ramp, friction rollers located adjacent said ramp to support the wheels of a road vehicle and abutment rollers located at a higher level than said friction rollers and said axes, means coupling the front and rear trucks together and including means for drawing the trucks toward each other to cause the wheels of the road vehicle to run up the respective ramps onto the respective friction rollers and to engage said abutment rollers to rock the truck frames on their pivots, thereby raising the ramps clear of the ground and elevating the road vehicle, one of said trucks also including power-transmission mechanism between its friction rollers and its railway wheels, the other of said trucks including steerable mountings for its railway wheels, which mountings have vertical pivots located at the outer sides of the wheels and cross-connected by arms and a connecting rod, opposed springs connecting said arms to the adjacent sides of the frame, and spring shock absorbers for the wheel mountings, by virtue of which the steerable wheels will automatically follow the curvature of the railway track by the guiding pressure of the wheel flanges of the railway wheels on the rails.

7. In mechanism for the purposes described, a front and a rear truck, each of said trucks comprising a frame, a pair of wheels on the common axes of which said frame is pivotally mounted, a ramp, friction rollers located adjacent said ramp to support the wheels of a road vehicle and abutment rollers located at a higher level than said friction rollers and said axes, means coupling the front and rear trucks together and including means for drawing the trucks toward each other to cause the wheels of the road vehicle to run up the respective ramps onto the respective friction rollers and to engage said abutment rollers to rock the truck frames on their pivots, thereby raising the ramps clear of the ground and elevating the road vehicle, one of said trucks also including power-transmission mechanism between its friction rollers and its railway wheels, the other of said trucks having wheel-bearing axles carried by vertical spindles which are pivotally mounted in supports on the truck frame at the outer side of the wheels, an articulated system of levers connecting said spindles, and draw springs connecting said system of levers to the truck frame and continuously tending to maintain the railway wheels in a straightway course, but yielding automatically through the pressure of the railway wheel flanges in rounding curves so that the wheels will follow the curvature of the track.

8. In mechanism for the purposes described, a front and a rear truck, each of said trucks comprising a frame, a pair of wheels on the common axes of which said frame is pivotally mounted, a ramp, friction rollers located adjacent said ramp to support the wheels of a road vehicle and abutment rollers located at a higher level than said friction rollers and said axes, and means coupling the front and rear trucks together and including means for drawing the trucks toward each other to cause the wheels of the road vehicle to run up the respective ramps onto the respective friction rollers and to engage said abutment rollers to rock the truck frames on their pivots, thereby raising the ramps clear of the ground and elevating the road vehicle, one of said trucks also including power-transmission mechanism between its friction rollers and its railway wheels, said power-transmission mechanism comprising toothed wheels carried by and of the same circumference as said friction rollers and toothed flanges on the railway wheels with which flanges said toothed wheels mesh.

9. In mechanism for the purposes described, a front and a rear truck, each of said trucks comprising a frame, a pair of wheels on the common axes of which said frame is pivotally mounted, a ramp, friction rollers located adjacent said ramp to support the wheels of a road vehicle and abutment rollers located at a higher level than said friction rollers and said axes, means coupling the front and rear trucks together and including means for drawing the trucks toward each other to cause the wheels of the road vehicle to run up the respective ramps onto the respective friction rollers and to engage said abutment rollers to rock the truck frames on their pivots, thereby raising the ramps clear of the ground and elevating the road vehicle, one of said trucks also including power-transmission mechanism between its friction rollers and its railway wheels, the said abutment rollers having flanges, and means to mount said abutment rollers for transverse adjustment.

10. In mechanism for the purposes described, a front and a rear truck, each of said trucks comprising a frame, a pair of wheels on the common axes of which said frame is pivotally mounted, a ramp, friction rollers located adjacent said ramp to support the wheels of a road vehicle and abutment rollers located at a higher level than said friction rollers and said axes, and means coupling the front and rear trucks together and including means for drawing the trucks toward each other to cause the wheels of the road vehicle to run up the respective ramps onto the respective friction rollers and to engage said abutment rollers to rock the truck frames on their pivots, thereby raising the ramps clear of the ground and elevating the road vehicle, one of said trucks also including power-transmission mechanism between its friction rollers and its railway wheels, the friction rollers of the rear truck having laterally adjustable single wheel supporting flanged members, and means adjustably holding said members in place on said friction rollers to support one road-wheel of a dual road-wheel assembly.

RUDOLF KLIMA.
PAUL PELLISCHEK.